2 Sheets—Sheet 1.
G. BRODIE.
METALLIC TIE FOR BALING.
No. 3.405. Reissued Apr. 27, 1869.
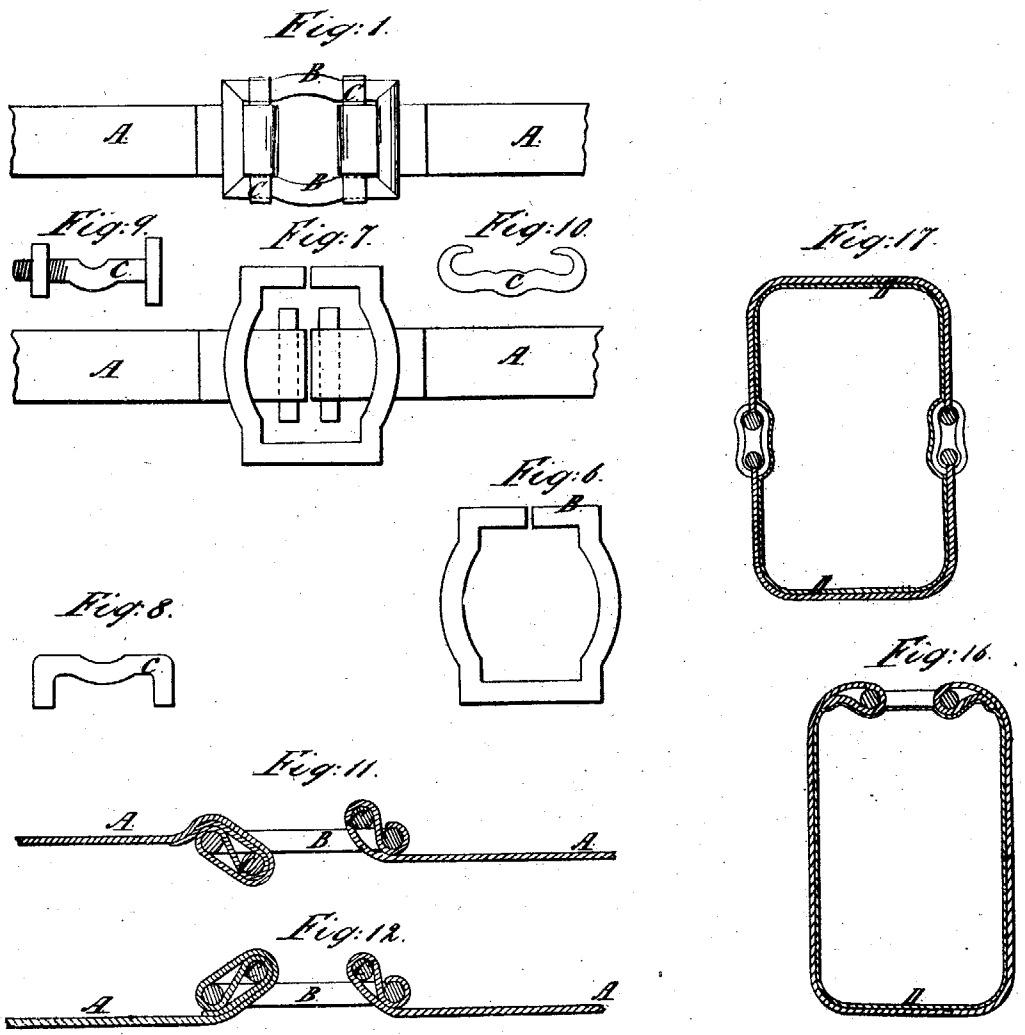
Witnesses
Jo McIntire
Wm M Pierson
Inventor
George Brodie 2 Sheets—Sheet 2.
G. BRODIE.
METALLIC TIE FOR BALING.
No. 3,405. Reissued Apr 27, 1869.
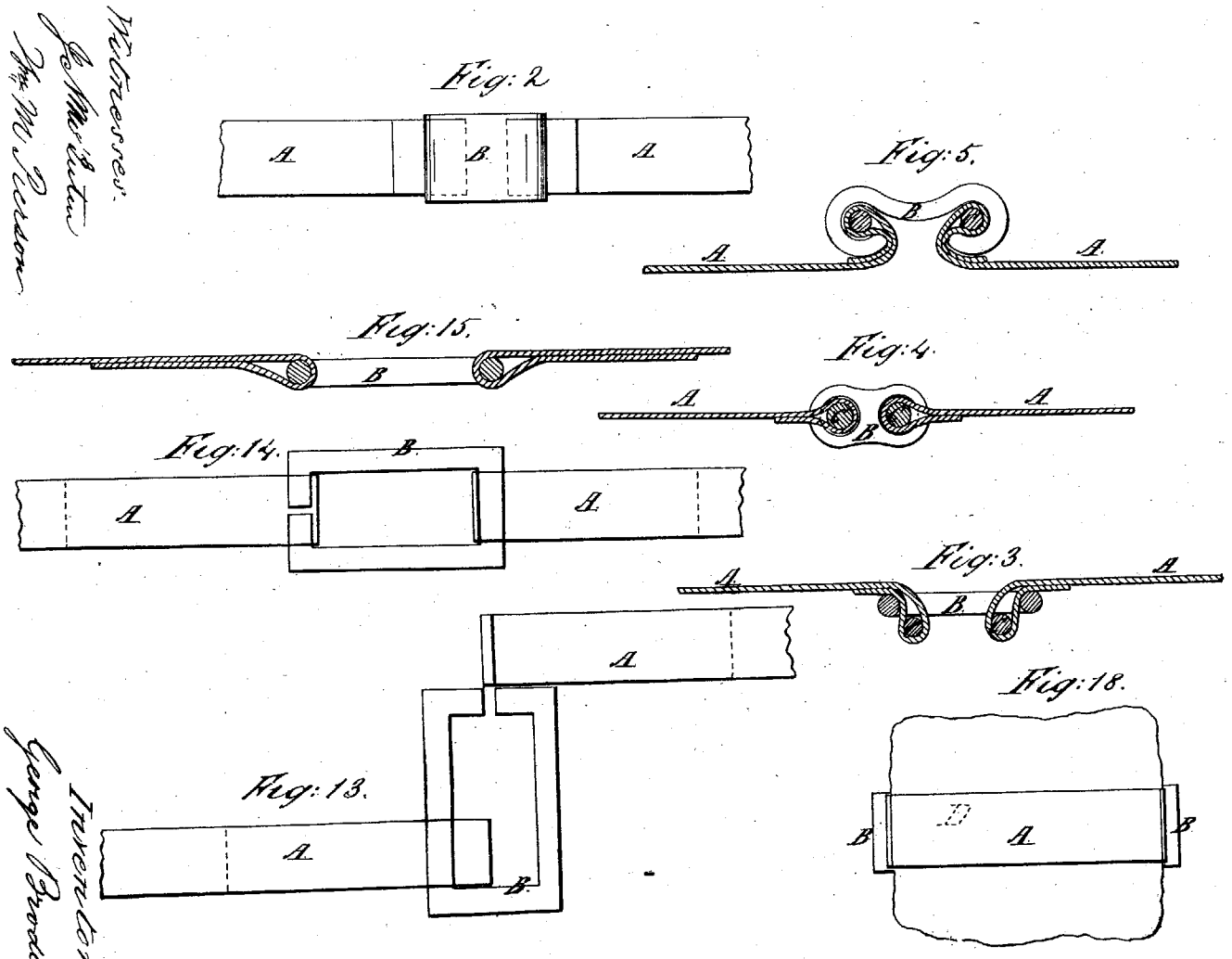
Witnesses.
J. McCutcheon
Wm M Pierson
Inventor.
George Brodie United States Patent Office.

GEORGE BRODIE, OF PLUM BAYOU, ARKANSAS.

*Letters Patent No.* 23,291, *dated March* 22, 1859; *reissue No.* 3,405, *dated April* 27, 1869.

IMPROVED METALLIC BAND FOR BALING.

The Schedule referred to in these Letters Patent and making part of the same.

*To all whom it may concern:*

Be it known that I, GEORGE BRODIE, formerly of Little Rock, in the county of Pulaski, but now of Plum Bayou, Jefferson county, State of Arkansas, have invented a new and improved Device for Tying Metallic Bands for Baling; and I do hereby declare the following to be a full and correct description of the same, reference being had to the accompanying drawings, in which—

Figure 1 is a top view of my improvement.

Figure 2 is a top view of another form of my improvement.

Figure 3 is a vertical section of the device represented in fig. 1, of one kind of connecting-link.

Figures 4 and 5 are similar sections, with connecting-links of different forms.

Figure 6 is a top view of the open connecting-link used in figs. 1, 3, 11, 12, 13, 14, 15, 16, and may be used instead of those shown in figs. 4 or 5, in figs. 17 and 18.

Figure 7 illustrates the mode of applying the connecting-link, fig. 6, to form the tie.

The ends of the hoop or band, with its inserted pins, are brought together after being passed around the bale, and the link is laid lengthwise over and across the ends of the band, with the pins inserted. The link is then turned to the position shown in fig. 1, when its length will be in line with the length of the hoop. The ends of the hoops, with the pins inserted, are drawn to the ends of the link, when one end of the hoop is bent around the slit or open end of the link. This keeps the link from turning, and also strengthens and keeps the jointed ends of the link better in place. The other end of the hoop can also be bent in the same manner, if desired, and thus be prevented from becoming loose or unhooked.

Figures 8, 9, and 10 show different forms of pins.

Figures 11 and 12 show different modes of bending the hoop around the open end of the connecting-link, whereby the open end of the link is strengthened and securely held in place.

Figures 13, 14, 15, and 16 show a mode of using the connecting-links B, fig. 6, without any pin, C; the ends of the hoops being bent, as in fig. 15, the connecting-link is slipped into the bent ends of the hoop, as shown in fig. 13. The link is then partly turned, to bring it on a line with the hoop, as shown in fig. 14, and the hoop, thus united on the side of the bale, is drawn around to the top or bottom of the bale, while in the press, as shown in fig. 16, and the elastic expansion of the bale, when relieved from compression, forces the bent ends of the hoops together, and prevents them from slipping.

Figure 17 shows a bale bound by using a tie on each side.

This is done when bales are intended to be reduced to smaller bulk by a second pressure, for the purpose of facilitating the second tying of the metallic bands, without injuring them.

Figure 18 is a top view of a strip of cloth, paper, or other suitable material, the same length as the hoops, or longer. It is marked, and lies between the hoop and the bales.

The letters D, in figs. 16 and 17, are edge views of the same. These strips are intended to prevent the hoops from injuring the covering around the bale or its contents.

Similar letters of reference indicate corresponding parts in all the figures.

The object of this invention is to enable larger or smaller bales to be tied without cutting or injuring the hoops, as no short or acute bends are required, all of which short or acute bends weaken and injure the hoops.

Another object is to be enabled to draw the tie tighter when the bulk of the bale is diminished, so that when applied to bales of cotton or other substance, that require to be reduced by a second compression, into less than their original bulk, the same hoops can be used, without cutting or injuring them, and may be used for baling many different times, and on bales of different sizes.

To enable others skilled in the art to make and use my invention, I will proceed to describe its construction and operation.

A, in all the figures, marks the hoop.

B shows the different connecting-links. All of these links embody the same principle of forming the tie, which is by bending the ends of the hoops, and inserting within the bends a proper metallic pin, making the pin longer than the width of the hoop, as shown in figs. 1, 3, 7, 8, 9, 10, 11, and 12.

The pins, if liable to work out of place, can be formed with their ends bent, as in fig. 8, making side guards for the links, or they can be made with depressions or elevations, as shown in figs. 8, 9, and 10; or with head and nut, as shown in fig. 9; or with ends bent around the side of the connecting-link, as shown in fig. 10, which will keep the slit end of the connecting-link from spreading open.

Fig. 6 is a top view of the connecting-link used in fig. 1, which link is made by bending suitable-sized metallic wire, making the opening in the middle of the link greater than at its ends, so as to enable it to turn readily around the prepared ends of the hoops, and making the ends of the metallic rod forming the link meet at or near the middle of one end of the connecting-link, when its ends may be joined and fastened together by well-known means, or it may be used without any such fastening.

Figures 2, 4, and 5 illustrate a form of connecting-link differing from that illustrated by figs. 1 and 3, in that the pins C in the latter are made of no greater length than the width of the hoop, while in the former they are necessarily longer, in order to rest upon the sides of the link.

The office of the pins in figs. 1 and 3 is to attach the ends of the hoop to the link, by means of their projecting ends; but in the device shown in figs. 2, 4, and 5 they act, by their bulk, to prevent the loop of the hook from being pulled out of the recess, in which it is held by reason of the extension given to the loop by the insertion of the pin within it, rendering it larger than the opening through which it must escape, if at all.

It results, from this arrangement, that the greater the strain upon the hoop, the tighter the loop is held in the recess of the link.

Various shapes may be given to the pins, as shown in figs. 8, 9, and 10. They may be held to the hoop, either by reason of irregularities of surface, as in fig. 8, by nuts on their edges, as in fig. 9, or by having hooks on their ends, to embrace the edges of the hoop, as in fig. 10.

The pins may be cut in length just the width of the hoops, when held by its thickness, and the pins keep from working out of the hoops by depression on each side of the pin, and the hoop pressed into the same; or the pins may be made with heads and nuts, as shown in fig. 9, or the links can be made closed up on one edge, and a clasp or button made to cover the opposite edge, as shown in figs. 2 and 4, or they can be made to bend around each edge, like fig. 10.

Having thus fully described my invention,

What I claim, and desire to secure by Letters Patent, is—

1. The bale-tie, formed by passing the bent ends or loops of the hoop A into the link B, and holding them there by means of the pins C C, passed through them and over the sides of the link, in the manner herein described, and shown in figs. 1 and 3.

2. The bale-tie, formed by passing the loops of the hoop A into one or more recesses in the link B, through a slit or opening in its side, and holding said loops in the recesses, by placing pins C within them, and thus giving such extension to the loops as to prevent their being withdrawn from the recesses while the pins remain in place, in the manner herein described, and as shown in figs. 4 and 5.

3. The connecting-link of a bale-tie, having a slit or opening in its side or end, through which the hoop can be introduced into the link, as herein described, and as represented in figs. 6, 7, 13, and 14.

The above specification of my said invention, signed and witnessed at Washington, this 9th day of March, A. D. 1869.

GEORGE BRODIE.

Witnesses:
A. C. BRADLEY,
CHAS. F. STANSBURY.